US012086828B2

(12) United States Patent
Aggarwal et al.

(10) Patent No.: US 12,086,828 B2
(45) Date of Patent: *Sep. 10, 2024

(54) CADENCE MANAGEMENT SYSTEM FOR CONSUMER PROMOTIONS

(71) Applicant: ByteDance Inc., Wilmington, DE (US)

(72) Inventors: Amit Aggarwal, Sunnyvale, CA (US); David Thacker, Burlingame, CA (US); Sean O'Brien, Fremont, CA (US)

(73) Assignee: BYTEDANCE INC., Wilmington, DE (US)

(*) Notice: Subject to any disclaimer, the term of this patent is extended or adjusted under 35 U.S.C. 154(b) by 343 days.

This patent is subject to a terminal disclaimer.

(21) Appl. No.: 17/302,482

(22) Filed: May 4, 2021

(65) Prior Publication Data

US 2021/0326925 A1  Oct. 21, 2021

Related U.S. Application Data

(63) Continuation of application No. 16/397,333, filed on Apr. 29, 2019, now Pat. No. 11,030,647, which is a (Continued)

(51) Int. Cl.
*G06Q 30/0251* (2023.01)
*G06Q 30/02* (2023.01)
*G06Q 30/0242* (2023.01)

(52) U.S. Cl.
CPC ......... *G06Q 30/0251* (2013.01); *G06Q 30/02* (2013.01); *G06Q 30/0242* (2013.01); (Continued)

(58) Field of Classification Search
CPC .............. G06Q 30/0251; G06Q 30/02; G06Q 30/0242; G06Q 30/0254; G06Q 30/0255; G06Q 30/0264; G06Q 30/0271 (Continued)

(56) References Cited

U.S. PATENT DOCUMENTS 4,212,231 A * 7/1980 Penick ............... G09F 1/06 493/379
6,029,195 A * 2/2000 Herz ............... H04N 21/25891 348/E7.071

(Continued)

FOREIGN PATENT DOCUMENTS

WO  02/41209 A1  5/2002
WO  2014/004810 A2  1/2014

OTHER PUBLICATIONS

Analysis_of_the_Actual_Response_Rates_in_Mobile_Advertising (Year: 2006).*

(Continued)

*Primary Examiner* — Gautam Ubale
(74) *Attorney, Agent, or Firm* — Alston & Bird LLP

(57) ABSTRACT

Systems and methods are presented for managing the cadence (e.g., frequency or rate) that electronic promotion correspondence is sent to a consumer. A system may access a target cadence indicator associated with a consumer that indicates of a target rate for sending electronic promotion correspondence to the consumer. The system may also determine an actual cadence indicator for the consumer over a predetermined period of time and analyze a potential electronic promotion correspondence for sending to the consumer. The system determines whether to send the electronic correspondence to the consumer based on the target cadence indicator, the actual cadence indicator, and the analysis of the electronic promotion correspondence.

17 Claims, 8 Drawing Sheets

Related U.S. Application Data continuation of application No. 13/838,711, filed on Mar. 15, 2013, now Pat. No. 10,325,284.

(60) Provisional application No. 61/666,556, filed on Jun. 29, 2012.

(52) U.S. Cl.
CPC ..... *G06Q 30/0254* (2013.01); *G06Q 30/0255* (2013.01); *G06Q 30/0264* (2013.01); *G06Q 30/0271* (2013.01)

(58) Field of Classification Search
USPC ........................................................ 705/14
See application file for complete search history.

(56) References Cited

U.S. PATENT DOCUMENTS

| | | | |
|---|---|---|---|
| 6,336,099 B1 | 1/2002 | Barnett et al. | |
| 6,415,262 B1* | 7/2002 | Walker | G06Q 30/0239 |
| | | | 705/14.27 |
| 6,915,271 B1* | 7/2005 | Meyer | G06Q 30/02 |
| | | | 705/14.35 |
| 6,922,672 B1 | 7/2005 | Hailpern et al. | |
| 7,225,143 B1* | 5/2007 | Kepecs | G06Q 30/0235 |
| | | | 705/14.27 |
| 7,251,617 B1* | 7/2007 | Walker | G06Q 30/0231 |
| | | | 705/16 |
| 7,809,601 B2 | 10/2010 | Shaya et al. | |
| 7,899,866 B1* | 3/2011 | Buckingham | H04L 51/212 |
| | | | 709/206 |
| 8,271,328 B1 | 9/2012 | Baltz et al. | |
| 8,359,238 B1 | 1/2013 | Kauchak et al. | |
| 8,583,484 B1 | 11/2013 | Chalawsky et al. | |
| 8,666,812 B1* | 3/2014 | Gandhi | G06Q 30/02 |
| | | | 705/14.52 |
| 8,738,434 B1* | 5/2014 | Rodriguez | G06Q 30/0282 |
| | | | 705/7.31 |
| 8,762,201 B1* | 6/2014 | Noonan | G06Q 30/0241 |
| | | | 705/14.41 |
| 9,231,897 B1 | 1/2016 | Liden | |
| 10,535,076 B1 | 1/2020 | Thacker et al. | |
| 11,030,647 B2* | 6/2021 | Aggarwal | G06Q 30/0255 |
| 11,080,754 B1 | 8/2021 | Han et al. | |
| 2001/0032247 A1 | 10/2001 | Kanaya | |
| 2002/0007356 A1* | 1/2002 | Rice | G06N 5/04 |
| | | | 706/47 |
| 2002/0032602 A1* | 3/2002 | Lanzillo, Jr. | G06Q 30/06 |
| | | | 705/14.66 |
| 2002/0062245 A1* | 5/2002 | Niu | G06Q 30/02 |
| | | | 705/14.51 |
| 2002/0161664 A1 | 10/2002 | Shaya et al. | |
| 2002/0161779 A1 | 10/2002 | Brierley et al. | |
| 2003/0018780 A1 | 1/2003 | Kawashima | |
| 2003/0055721 A1* | 3/2003 | Beery, II | G06Q 30/0601 |
| | | | 705/26.1 |
| 2003/0105664 A1* | 6/2003 | Van Luchene | G07C 15/005 |
| | | | 705/14.13 |
| 2003/0208399 A1 | 11/2003 | Basak et al. | |
| 2004/0032393 A1* | 2/2004 | Brandenberg | G06F 16/9535 |
| | | | 707/E17.11 |
| 2004/0054574 A1* | 3/2004 | Kaufman | G06Q 30/0258 |
| | | | 705/14.56 |
| 2004/0088363 A1 | 5/2004 | Doemling et al. | |
| 2004/0103024 A1* | 5/2004 | Patel | G06Q 30/0275 |
| | | | 705/14.53 |
| 2004/0122730 A1 | 6/2004 | Tucciarone et al. | |
| 2004/0123314 A1 | 6/2004 | Bova | |
| 2005/0075932 A1* | 4/2005 | Mankoff | G06Q 30/0258 |
| | | | 705/14.57 |
| 2005/0228719 A1* | 10/2005 | Roberts | G06Q 30/0261 |
| | | | 705/14.66 |
| 2006/0090185 A1* | 4/2006 | Zito | H04N 21/44224 |
| | | | 348/E7.073 |
| 2006/0135233 A1 | 6/2006 | Willis et al. | |
| 2006/0136545 A1 | 6/2006 | Reistad et al. | |
| 2006/0178932 A1* | 8/2006 | Lang | G06Q 30/02 |
| | | | 705/14.73 |
| 2007/0055565 A1 | 3/2007 | Baur et al. | |
| 2007/0055569 A1 | 3/2007 | Subramanian et al. | |
| 2007/0061195 A1 | 3/2007 | Liu et al. | |
| 2007/0083433 A1 | 4/2007 | Lawe | |
| 2007/0112920 A1 | 5/2007 | Hay | |
| 2007/0150342 A1 | 6/2007 | Law et al. | |
| 2008/0015936 A1* | 1/2008 | Bibelnieks | G06Q 30/0277 |
| | | | 705/14.43 |
| 2008/0015938 A1 | 1/2008 | Haddad et al. | |
| 2008/0027787 A1 | 1/2008 | Malsbenden et al. | |
| 2008/0033811 A1* | 2/2008 | Brown | G06Q 30/02 |
| | | | 705/14.66 |
| 2008/0103909 A1* | 5/2008 | Huang | G06Q 30/02 |
| | | | 705/14.27 |
| 2008/0154714 A1* | 6/2008 | Liu | G06Q 30/0236 |
| | | | 705/14.36 |
| 2008/0160956 A1 | 7/2008 | Jackson et al. | |
| 2008/0201643 A1* | 8/2008 | Nagaitis | G06Q 30/0255 |
| | | | 715/738 |
| 2008/0202889 A1* | 8/2008 | Breitenbach | G07F 17/42 |
| | | | 194/217 |
| 2008/0208787 A1* | 8/2008 | Luchene | G06Q 30/0224 |
| | | | 706/47 |
| 2008/0229244 A1 | 9/2008 | Markus et al. | |
| 2008/0262928 A1* | 10/2008 | Michaelis | G06Q 30/02 |
| | | | 705/14.39 |
| 2009/0030798 A1* | 1/2009 | Otto | G06Q 30/06 |
| | | | 705/26.1 |
| 2009/0047946 A1 | 2/2009 | Sato et al. | |
| 2009/0048926 A1* | 2/2009 | Salesky | G06Q 20/10 |
| | | | 705/14.13 |
| 2009/0063274 A1* | 3/2009 | Dublin, III | G06Q 30/02 |
| | | | 705/14.1 |
| 2009/0125321 A1* | 5/2009 | Charlebois | G06Q 30/0281 |
| | | | 705/346 |
| 2009/0138328 A1* | 5/2009 | Higgins | G06Q 30/0207 |
| | | | 705/14.1 |
| 2009/0144201 A1* | 6/2009 | Gierkink | G06Q 30/0246 |
| | | | 705/40 |
| 2009/0150218 A1* | 6/2009 | Brunner | G06Q 30/0261 |
| | | | 705/14.58 |
| 2009/0164296 A1 | 6/2009 | Phan | |
| 2009/0216579 A1* | 8/2009 | Zen | G06Q 30/0207 |
| | | | 705/14.1 |
| 2009/0265229 A1* | 10/2009 | Sidhu | G06Q 30/02 |
| | | | 705/26.1 |
| 2009/0265763 A1* | 10/2009 | Davies | H04L 51/224 |
| | | | 709/206 |
| 2009/0271266 A1* | 10/2009 | Regmi | G06Q 30/0244 |
| | | | 707/999.107 |
| 2009/0313109 A1* | 12/2009 | Bous | G06Q 30/02 |
| | | | 705/26.1 |
| 2010/0004997 A1* | 1/2010 | Mehta | G06Q 30/0269 |
| | | | 705/14.66 |
| 2010/0057586 A1* | 3/2010 | Chow | G06Q 30/0623 |
| | | | 705/26.1 |
| 2010/0076832 A1* | 3/2010 | Cha | G06Q 30/0225 |
| | | | 705/14.36 |
| 2010/0088157 A1 | 4/2010 | Wilson | |
| 2010/0091677 A1* | 4/2010 | Griff | H04L 41/22 |
| | | | 370/252 |
| 2010/0250359 A1 | 9/2010 | Gillenson et al. | |
| 2010/0262461 A1* | 10/2010 | Bohannon | G06Q 40/03 |
| | | | 705/26.1 |
| 2010/0299209 A1 | 11/2010 | Mehta et al. | |
| 2010/0318407 A1 | 12/2010 | Leff et al. | |
| 2010/0318418 A1 | 12/2010 | Wertheimer et al. | |
| 2011/0016161 A1* | 1/2011 | Loeb | G06F 16/9535 |
| | | | 715/745 |
| 2011/0029363 A1* | 2/2011 | Gillenson | G06Q 30/0231 |
| | | | 705/14.15 |

(56) References Cited

U.S. PATENT DOCUMENTS

| | | | | |
|---|---|---|---|---|
| 2011/0040609 | A1* | 2/2011 | Hawkins | G06Q 30/02 705/1.1 |
| 2011/0055001 | A1 | 3/2011 | Mattern et al. | |
| 2011/0066692 | A1* | 3/2011 | Ciancio-Bunch | H04L 51/234 709/206 |
| 2011/0078026 | A1* | 3/2011 | Durham | G06Q 30/02 705/14.66 |
| 2011/0184813 | A1* | 7/2011 | Barnes | G06F 16/9535 705/14.66 |
| 2011/0184937 | A1 | 7/2011 | Jin | |
| 2011/0191176 | A1* | 8/2011 | Merriman | G06Q 30/0257 705/14.49 |
| 2011/0208578 | A1 | 8/2011 | Bergh et al. | |
| 2011/0208585 | A1 | 8/2011 | Daboll et al. | |
| 2011/0225034 | A1 | 9/2011 | Bayat | |
| 2011/0231321 | A1* | 9/2011 | Milne | G06Q 30/00 705/14.66 |
| 2011/0238501 | A1 | 9/2011 | Almeida | |
| 2011/0246297 | A1 | 10/2011 | Buchalter et al. | |
| 2011/0246306 | A1* | 10/2011 | Blackhurst | G06Q 30/0261 705/14.66 |
| 2011/0276373 | A1 | 11/2011 | Juszczak et al. | |
| 2011/0282964 | A1* | 11/2011 | Krishnaswamy | G06Q 30/02 709/217 |
| 2011/0288921 | A1* | 11/2011 | King | G06Q 30/02 705/347 |
| 2011/0302025 | A1* | 12/2011 | Hsiao | G06Q 30/0242 705/14.42 |
| 2011/0313840 | A1* | 12/2011 | Mason | H04W 4/029 705/14.35 |
| 2012/0022944 | A1* | 1/2012 | Volpi | G06Q 30/0207 705/14.1 |
| 2012/0042025 | A1 | 2/2012 | Jamison et al. | |
| 2012/0054020 | A1 | 3/2012 | Jacobs | |
| 2012/0054031 | A9 | 3/2012 | Walker et al. | |
| 2012/0101881 | A1 | 4/2012 | Taylor et al. | |
| 2012/0116840 | A1 | 5/2012 | Omer | |
| 2012/0130817 | A1 | 5/2012 | Bousaleh et al. | |
| 2012/0143666 | A1* | 6/2012 | Carrion | G06Q 30/02 705/14.23 |
| 2012/0158494 | A1 | 6/2012 | Reis et al. | |
| 2012/0158875 | A1 | 6/2012 | Almeida | |
| 2012/0166267 | A1* | 6/2012 | Beatty | G06Q 30/0219 705/14.46 |
| 2012/0166433 | A1 | 6/2012 | Tseng | |
| 2012/0179551 | A1* | 7/2012 | Georgakis | G06Q 30/00 705/14.64 |
| 2012/0191530 | A1* | 7/2012 | Williams | G06Q 30/0277 705/14.42 |
| 2012/0209673 | A1* | 8/2012 | Park | G06Q 30/02 705/14.15 |
| 2012/0209686 | A1* | 8/2012 | Horowitz | G06Q 30/0224 705/14.26 |
| 2012/0259702 | A1 | 10/2012 | Zhang et al. | |
| 2012/0265597 | A1 | 10/2012 | Saha et al. | |
| 2012/0265646 | A1 | 10/2012 | Ghadialy et al. | |
| 2012/0278172 | A1* | 11/2012 | Mercuri | G06Q 30/02 705/14.58 |
| 2012/0290383 | A1* | 11/2012 | Busch | G06Q 30/02 705/14.58 |
| 2012/0316949 | A1* | 12/2012 | Chen | G06Q 30/02 705/14.26 |
| 2012/0330735 | A1 | 12/2012 | Gasparine | |
| 2012/0330741 | A1* | 12/2012 | Cruz | G06Q 30/0214 705/14.31 |
| 2013/0013545 | A1* | 1/2013 | Agarwal | G06F 16/9537 706/46 |
| 2013/0024298 | A1 | 1/2013 | Irvine et al. | |
| 2013/0073381 | A1* | 3/2013 | Binkley | G06Q 30/02 705/14.48 |
| 2013/0073388 | A1* | 3/2013 | Heath | G06Q 50/01 705/14.53 |
| 2013/0085804 | A1 | 4/2013 | Leff et al. | |
| 2013/0124299 | A1 | 5/2013 | Montgomery et al. | |
| 2013/0132183 | A1 | 5/2013 | Klein et al. | |
| 2013/0132365 | A1 | 5/2013 | Chang et al. | |
| 2013/0159192 | A1* | 6/2013 | Partridge | G06Q 30/02 705/14.1 |
| 2013/0173393 | A1 | 7/2013 | Calman et al. | |
| 2013/0179264 | A1 | 7/2013 | Wilson | |
| 2013/0238425 | A1* | 9/2013 | Saldanha | G06Q 30/02 705/14.71 |
| 2013/0290141 | A1* | 10/2013 | Bhaskar | G06Q 30/0603 705/26.61 |
| 2013/0290503 | A1 | 10/2013 | Rajkumar et al. | |
| 2013/0332277 | A1 | 12/2013 | Faith et al. | |
| 2013/0346170 | A1* | 12/2013 | Epstein | G06Q 30/0226 705/14.14 |
| 2014/0006129 | A1 | 1/2014 | Heath | |
| 2014/0006139 | A1 | 1/2014 | Aggarwal et al. | |
| 2014/0040007 | A1* | 2/2014 | Relyea, Jr. | G06Q 30/0242 705/14.57 |
| 2014/0095324 | A1 | 4/2014 | Cabral et al. | |
| 2014/0120864 | A1 | 5/2014 | Manolarakis et al. | |
| 2014/0122238 | A1 | 5/2014 | Lewis et al. | |
| 2014/0171039 | A1* | 6/2014 | Bjontegard | H04L 67/535 455/414.1 |
| 2014/0180817 | A1 | 6/2014 | Zilkha | |
| 2018/0012195 | A1* | 1/2018 | Nagaraj | G06Q 10/1095 |
| 2020/0290467 | A1* | 9/2020 | Gao | H04B 5/79 |

OTHER PUBLICATIONS

Collective Attention and the Dynamics of Group Deals (Year: 2011).*

P3-coupon_A_probabilistic_system_for_Prompt_and_Privacy-preserving_electronic_coupon_distribution (Year: 2011).*

Forecasting_and_analysis_of_marketing_data_using_neural_networks_a_case_of_advertising_and_promotion_impact (Year: 1995).*

To_Send_or_Not_to_Send_An_Empirical_Assessment_of_Error_Reporting_Behavior (Year: 2008).*

A Multimethod Approach to Evaluating Social Media Campaign Effectiveness (Year: 2013).

Periodic Email Prompts to Re-Use an Internet-Delivered Computer-Tailored Lifestyle Program: Influence of Prompt Content and Timing (Year: 2013).

Targeted Advertising for the Communication Service Provider (Year: 2010).

Anonymous, Advertisement System, Method and Computer Program Product, ip.com, Published Jul. 24, 2006.

Anshin, Peter et al., "Developing an Index for Measuring the Engagement of Internet Media"; 2008 IEEE International Conference on Systems, Man and Cybernetics (SMC 2008); dated (2008); pp. 2182-2190.

Authors et al., "WI-OC-P Just-In-Time Promotion with Dynamic Adjustments Responsive to Customer Behavior", IP.com, dated (Mar. 6, 2009).

Byers et al., "Daily Deals Prediction, Social Diffusion, and Reputational Ramifications" dated (Sep. 7, 2011).

Dow et al., A Location-based Mobile Advertisement Publishing System for vendors 2011 Eighth International Conference on Information Technology: New Generations, Feng Chia Univ., Taichung, Taiwan (downloaded May 11, 2021).

Drossos et al., "An Empirical Assessment of Factors that Influence the Effectiveness of SMS Advertising", Proceedings of the 40th Hawaii International Conference on System Sciences, dated (2007).

Extended European Search Report from corresponding European Patent Application No. 13739541.4 dated Dec. 11, 2015.

International Search Report and Written Opinion for Application No. PCT/US2013/048154 dated Dec. 1, 2014.

Jun et al., Design of Tag Match Advertising System and the evaluation of the business model, IEEE Asisa-Pacific Services Computing Conference, Feb. 2008.

PCT International Preliminary Report on Patentability for application PCT/US2013/048154 dated Dec. 31, 2014.

Rapleaf "The Consumer Data Marketplace" www.rapleaf.com/under-the-hood/ retrieved on May 7, 2013. (Year: 2013).

(56) References Cited

OTHER PUBLICATIONS

Supplementary European Search Report from corresponding European Patent Application No. 13739541.4 dated Jan. 8, 2016.
U.S. Application entitled "Sales Enhancement System", U.S. Appl. No. 13/460,745.
U.S. Patent Application filed Jan. 31, 2013, In re: Thacker entitled "entitled Pre-Feature Promotion System", U.S. Appl. No. 13/756,145.
U.S. Patent Application filed Mar. 15, 2013, In re: Aggarwal entitled "Cadence Management System for Consumer Promotions", U.S. Appl. No. 13/838,711.
U.S. Patent Application filed Mar. 15, 2013, In re: Li entitled "Promotion Offering System Analyzing Collection of Promotions", U.S. Appl. No. 13/838,415.
U.S. Patent Application filed Mar. 15, 2013, In re: Trimble entitled "Customization of Message Delivery Time Based on Consumer Behavior", U.S. Appl. No. 13/839,102.
U.S. Patent Application filed Mar. 2, 2012, In re: O'Brien entitled "Relevance System for Consumer Deals", U.S. Appl. No. 13/411,502.
U.S. Provisional Application entitled "Promotion Offering System Analyzing Collections of Promotions", U.S. Appl. No. 61/663,508.

* cited by examiner

CADENCE MANAGEMENT SYSTEM FOR CONSUMER PROMOTIONS

CROSS-REFERENCE TO RELATED APPLICATIONS

This application is a continuation of U.S. application Ser. No. 16/397,333, filed Apr. 29, 2019, which is a continuation of U.S. application Ser. No. 13/838,711, filed Mar. 15, 2013, which claims the benefit of priority of U.S. Provisional Application No. 61/666,556, filed Jun. 29, 2012, the entireties of which are hereby incorporated by reference herein.

TECHNICAL FIELD

The present description relates to offering promotions associated with a product or a service. This description also relates to determining whether to send electronic promotion correspondence to a consumer according to a target electronic correspondence cadence.

BACKGROUND

Merchants typically offer promotions to consumers from time to time in order to generate more business. The promotions offered may be in the form of discounts, deals, rewards or the like. Often times, a promotion, or a number of promotions, may be presented to a consumer in the form of an electronic correspondence. When a multitude of electronic correspondences are generated for a consumer, it may be difficult to determine which electronic correspondence to present to the consumer.

SUMMARY OF THE INVENTION

Systems and methods for determining whether to send electronic promotion correspondence to a consumer according to a target electronic correspondence cadence are disclosed.

In a first aspect, a method includes accessing a target cadence indicator associated with a consumer, where the target cadence indicator is indicative of a target rate for sending electronic promotion correspondence to the consumer; determining an actual cadence indicator, where the actual cadence indicator is indicative of an actual rate that previous electronic promotion correspondence was sent to the consumer; accessing a first electronic promotion correspondence including a first promotion; analyzing the first electronic promotion correspondence; and determining whether to send the first electronic correspondence to the consumer based on the target cadence indicator, the actual cadence indicator, and the analyzing of the first electronic promotion correspondence.

In another aspect, a system includes a memory storing processor-executable instructions and a processor in communication with the memory. The processor is configured to execute the processor-executable instructions to access a cadence threshold value associated with a consumer, the cadence threshold value indicative of a rate which electronic promotion correspondence is sent to the consumer; access a first electronic promotion correspondence including a first promotion; determine a cadence score for the consumer based on the first promotion of the first electronic promotion correspondence; and determine whether to send the first electronic correspondence to the consumer by comparing the cadence threshold value associated with the consumer with the cadence score for the consumer.

In another aspect, a method includes determining an electronic correspondence cadence for a consumer, the electronic correspondence cadence indicative of a rate that electronic promotion correspondence including one or more promotions is sent to the consumer; and at a time when the electronic correspondence cadence specifies sending an electronic promotion correspondence to the consumer: accessing a first electronic promotion correspondence; and determining whether to send the first electronic promotion correspondence to the consumer when the first electronic promotion correspondence satisfies a cadence criterion.

Other systems, methods, and features will be, or will become apparent to one with skill in the art upon examination of the following figures and detailed description. It is intended that all such additional systems, methods, and features included within this description, be within the scope of the disclosure, and be protected by the following claims.

BRIEF DESCRIPTION OF THE DRAWINGS

The present invention may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

The present invention as described herein may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein.

The description below refers to cadence or electronic correspondence cadence. Cadence may refer to a rate at which electronic promotion correspondence is sent to a consumer. Cadence may represent, for example, a desired, target, or actual rate. Cadence can be expressed in multiple ways or take any number of forms, several of which are described below. For example, electronic correspondence cadence for a consumer may be expressed as a frequency over a period of time (e.g., once every 3 days, twice a day, 3.1 correspondences sent per week, etc.) Cadence may be expressed as a numerical value indicative of the rate at which electronic promotion correspondence is sent to the consumer, for instance where increased cadence values indicate an increased frequency of electronic promotion correspondence sent to the consumer. Cadence may also be expressed as a frequency range or range of rates. The description below includes systems and methods for managing the cadence of electronic promotion correspondence sent to a consumer or set of consumers.

Figure 1:
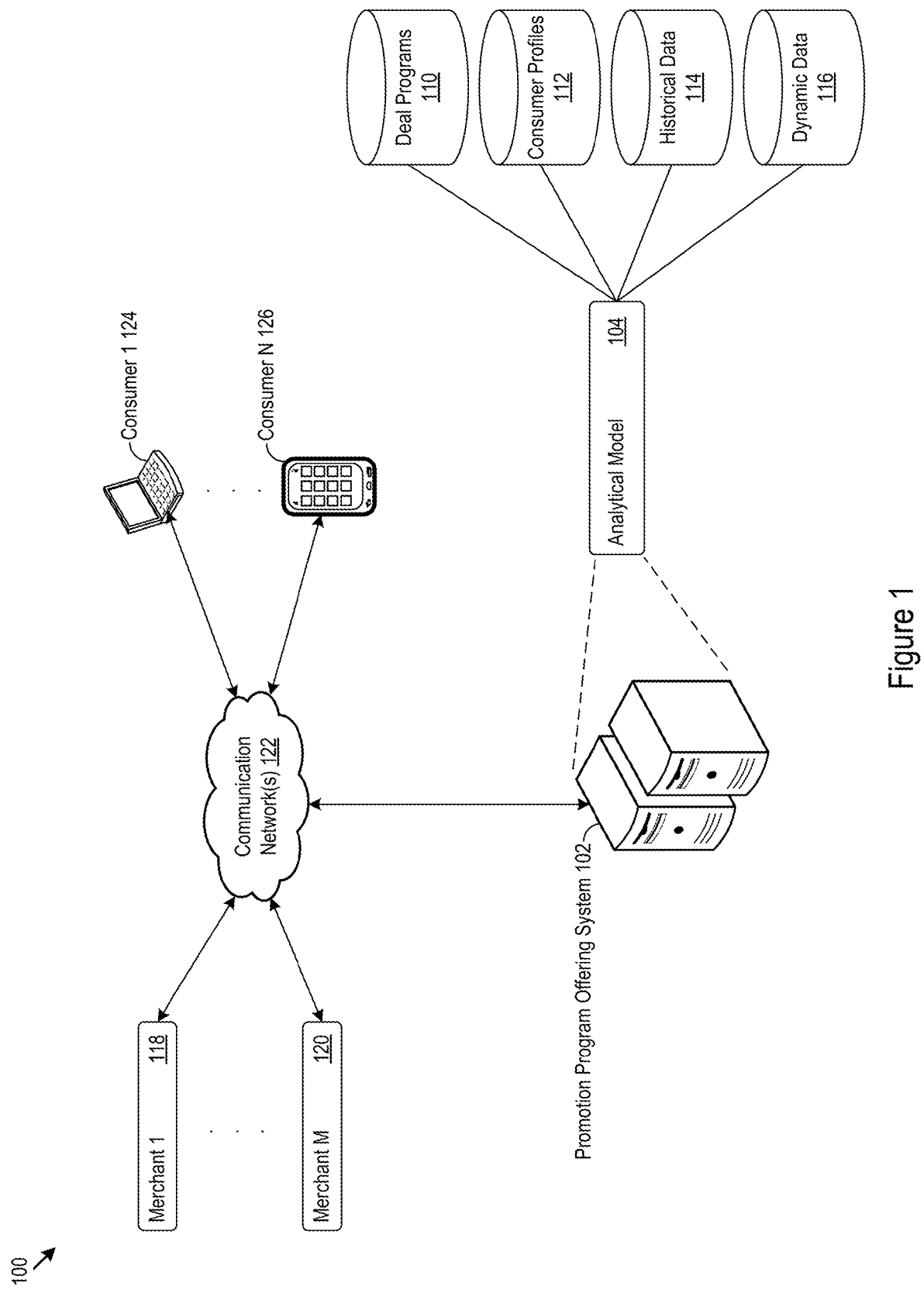
FIG. 1 shows an example of a system for managing the cadence of electronic promotion correspondence sent to one or more consumers.

FIG. 1 shows an example of a system 100 for managing the cadence of electronic promotion correspondence sent to one or more consumers. The system 100 includes a promotion program offering system 102, which communicates via one or more networks 122 with one or more consumers, such as consumer 1 124, consumer N 126, and more. The promotion program offering system 102 may send promotions to a consumer through any means or communication channel accessible by the consumer. For example, the promotion program offering system 102 may communicate with consumers by sending electronic promotion correspondence directly to a consumer device, such as a laptop computer used by consumer 1 124, a mobile telephone used by consumer N 126, or any other electronic device that can receive electronic promotion correspondence. The promotion program offering system 102 may also send electronic promotion correspondence to a consumer to an e-mail account or other information access point accessible by the consumer, e.g., via a consumer device. The promotion program offering system 102 may communicate with one or more merchants, such as the merchants labeled in FIG. 1 as merchant 1 118 and merchant M 120.

The promotion program offering system 102 includes an analytical model 104 that is in communication with databases 110, 112, 114, 116. The analytical model 104 may include one or more components, logic, or circuitry for grouping a number of promotions. The analytical model 104 may further include one or more components, logic, or circuitry for generating electronic promotion correspondence that includes one or more promotions.

A promotion may include any type of reward, discount, coupon, credit, deal, voucher or the like used toward part or all of the purchase of a product or a service. The promotion may be offered as part of a larger promotion program, or the promotion may be offered as a stand-alone one time promotion. In an effort to better distinguish and identify the promotion, the promotion may include one or more attributes, such as the merchant offering the promotion (e.g., merchant 1 118, which may be identified as "XYZ coffee shop"), the redemption location of the promotion, the amount of the promotion, the category of the promotion (such as a restaurant promotion, a spa promotion, a travel promotion, a local promotion, etc.), the subcategory of the promotion (such as a sushi restaurant), or the like. A promotion may be characterized by a promotion score. The analytical model 104 may generate a promotion score for a promotion, including a consumer-specific promotion score based on one or more attributes, historical data, or other characteristics of the consumer and/or the promotion. In one implementation, the promotion score of a promotion may be a probability indicator of estimation that the particular consumer accepting (e.g., purchasing) the promotion.

To generate promotion scores, the analytical model 104 may access data with respect to a particular consumer, a particular promotion, or both. The analytical model 104 may communicate with multiple databases of the promotion program offering system 102 such as a promotion program database 110, consumer profiles database 112, historical data database 114 and dynamic data database 116. With respect to the particular consumer, the analytical model 104 may access the databases 110, 112, 114 and 116 in order to obtain specific attribute information on the particular consumer and the various promotions being scored. Various attributes may be associated or assigned to a promotion and a consumer in the promotion system 100. The analytical model 104 may use obtained attribute information to generate promotion scores for each promotion. An example of scoring promotions is disclosed in U.S. application Ser. No. 13/411,502, incorporated by reference herein in its entirety. An example for scoring a grouping of promotions is disclosed in U.S. patent application Ser. No. 13/838,415, title "Promotion Offering System Analyzing Collections of Promotions," and filed on Mar. 15, 2013, hereby incorporated by reference herein in its entirety.

The promotion programs database 110 may store data detailing various promotions and promotion programs available for offer in the promotion program offering system 102. In order to input promotion program information into the promotions program database 110, merchants (e.g., merchant 1 118) may communicate through the communication networks 122 with the promotion program offering system 102 to input the information detailing the various promotion program offerings.

The consumer profiles database 112 may store consumer profiles for consumers, such as consumer 1 124 and consumer N 126. A consumer profile stored in consumer profiles database 112 may indicate any attributes or data with respect to the consumer, including, for instance, the name, age, gender, addresses (e.g., home, work, addresses of interest), occupation, educational background, previously accepted promotion program offerings, previously rejected promotion program offerings, and the like. The analytical model 104 may use one, some, or all of the attributes of the consumer in managing the electronic correspondence cadence of the consumer and/or determining whether to send an electronic promotion correspondence to the consumer.

The historical data database 114 may store data of previously offered promotion programs, such as performance detailing the past performance of promotion program offerings presented by the promotion program system 102. The historical data database 114 may include, as examples, rates of acceptances of specific promotion programs, attributes of consumers that accepted or rejected specific promotion programs, and the like.

The dynamic data database 116 may store data of presently active promotion programs, such as performance data of a promotion program offering that is currently active in the promotion offering system 102. While a promotion program referenced in the dynamic data database 116 is currently active, the data stored in the dynamic data database 116 may pertain to performance data of the active promotion program from a previous time period.

Although FIG. 1 has been illustrated to show separate databases 110, 112, 114 and 116, FIG. 1 has been illustrated for demonstrative purposes only, and it is contemplated to have the databases 110, 112, 114 and 116 arranged in any combination of one or more memories/storage units.

In operation and as described in greater detail below, the promotion program offering system 102, through the analytical model 104, manages the cadence of electronic promotion correspondence sent to a consumer or set of consumers. For example, the analytical model 104 may maintain a target cadence for a particular consumer or set of consumers sharing a common consumer attribute. The analytical model 104 may adjust or control the rate at which electronic promotion correspondence is sent to the particular consumer based on the target cadence for the particular consumer along with various additional factors.

Figure 2:
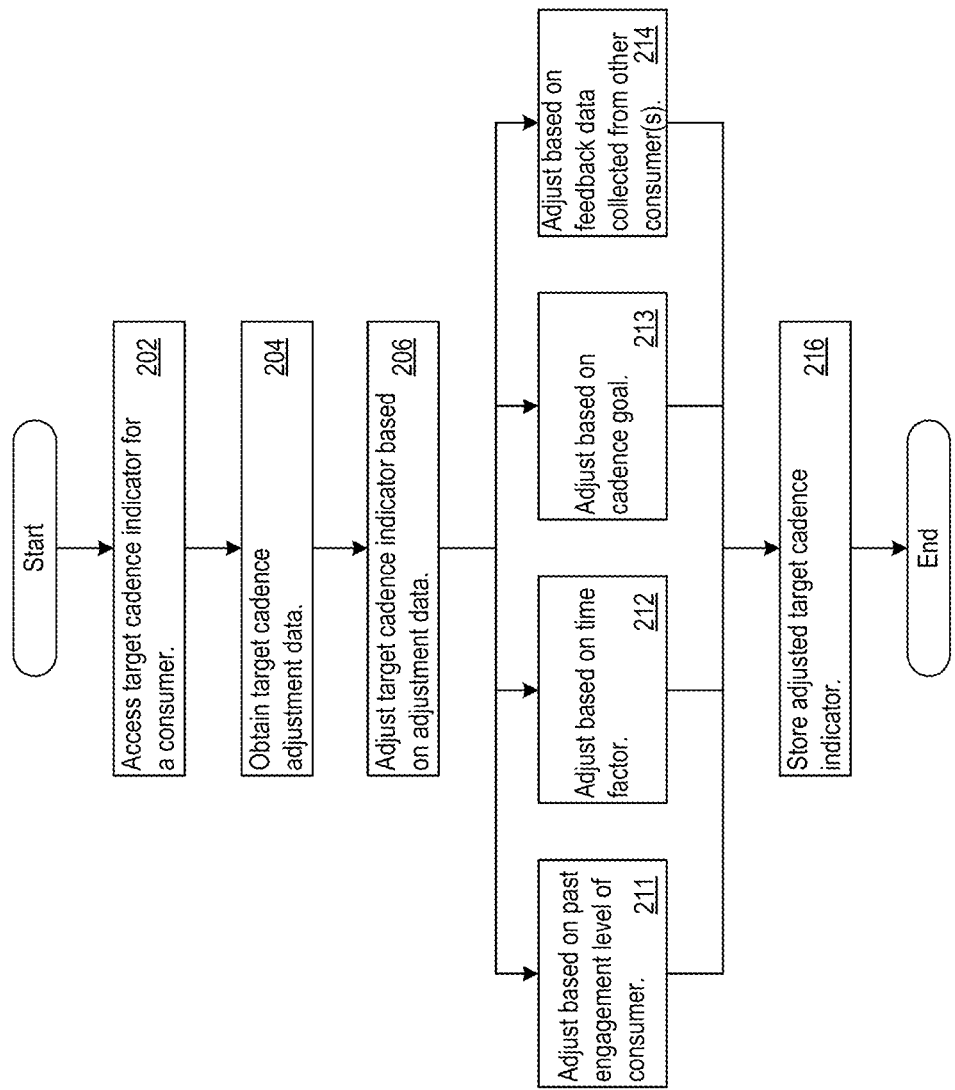
FIG. 2 shows an example of logic for determining a target cadence for a consumer.

FIG. 2 shows an example of logic 200 for determining a target cadence for a consumer. The logic 200 may be implemented in hardware, software, or a combination of both. For example, the analytical model 104 may implement the logic 200 as software to determine or adjust a target cadence.

The analytical model 104 accesses a target cadence indicator for a consumer (202). The target cadence indicator may refer to any indicator that specifies a target cadence for a consumer or indicates a target rate for sending electronic promotion correspondence to the consumer. In one implementation, the target cadence indicator is a numerical value specifying a target frequency at which electronic promotion correspondence is sent to the consumer. The target cadence indicator may indicate a target number of electronic promotion correspondences to send to the consumer for a given time period, such as 3.2 per week (this example indicating a targeted average frequency over time). In one example, the analytical model 104 accesses the target cadence indicator for a consumer by retrieving the target cadence indicator from a memory of the analytical model 104 or from an accessible database, e.g., the consumer profiles database 112.

The analytical model 104 may assign an initial target cadence for a consumer. When a consumer initially elects to receive electronic promotion correspondence from the promotion program offering system 102 (e.g., enrolling in an e-mail service), the analytical model 104 may lack sufficient data to effectively determine a target cadence for the consumer.

In one implementation, the analytical model 104 maintains or receives feedback data from other consumers to determine an initial target cadence for the consumer. For example, the analytical model 104 may apply multiple electronic correspondence cadences to a set of consumers, where each of the multiple electronic correspondence cadences was applied to a different portion of the set of consumers. The analytical model 104 may extract a specific portion of the feedback that corresponds to a consumer attribute of the consumer, such as a specific portion of the feedback for consumers sharing a common age, gender, location, interests, occupation, or other consumer attribute with the consumer. Then, the analytical model 104 may determine the initial target cadence for the consumer using the specific portion of the feedback, such as selecting the applied cadence to the different portions of the set of consumers that resulted in the highest level of engagement or according to any other target cadence determination criterion or goal.

The target cadence for a consumer may account for any number of factors. Accordingly, the analytical model 104 may adjust a target cadence indicator for the consumer in various ways. The analytical model may obtain target cadence adjustment data (204) and adjust the target cadence indicator for the consumer based on the adjustment data (206). Several examples of target cadence adjustment factors and data are presented next.

The analytical model may adjust the target cadence for a consumer based on a past engagement level of the consumer (211). The engagement level of the consumer may refer to any response data indicating the degree or level to which the consumer accessed previously sent electronic promotion correspondence. The analytical model 104 may determine, as examples, a number of previously sent electronic promotion correspondence accessed by the consumer (e.g., e-mails opened), a number of previously presented promotions accessed by the consumer (e.g., webpages of promotions accessed), a number of previously presented promotions purchased by the consumer, a total, average, or maximum value of promotions purchased by the consumer, and more. The analytical model 104 may use the past engagement level data or measure the past engagement level of the user for a predetermined or configurable time period, e.g., the last two weeks, the last 6 months, time in which a particular number of electronic promotion correspondences were sent to the consumer, etc.

The analytical model 104 may measure past engagement level values for one or multiple past engagement level metrics and adjust the target cadence indicator of the consumer accordingly. The analytical model 104 may prioritize between different past engagement level metrics through a weighted adjustment, giving increased weights to higher priority past engagement level metrics and decreased weights to lower priority past engagement level metrics.

The analytical model 104 may adjust the target cadence indicator for a consumer according to whether the past engagement level of the consumer exceeds or falls below an engagement adjustment threshold. The analytical model 104 may specify different engagement thresholds for different past engagement level metrics. As examples, as measured for a predetermined time period, the analytical model 104 may increase the target cadence for a consumer when the consumer exceeds high engagement thresholds, such as accessing more than 90% of sent electronic promotion correspondence, purchasing more than 10 promotions, accessing more than 25% of total promotions presented through one or more electronic promotion correspondences, etc. As other examples, the analytical model 104 may decrease the target cadence for the consumer when the past engagement level of the consumer falls below low engagement thresholds, such as accessing less than 25% of sent electronic promotion correspondence, purchasing less 2 promotions, accessing less than 5% of total presented promotions, etc.

In another variation, the analytical model 104 may categorize the past engagement level of the consumer into one of multiple engagement tiers (e.g., very low, low, normal, high, very high). The analytical model 104 may then adjust the target cadence factor of the consumer based on which tier the past engagement level of the consumer is categorized as.

The analytical model 104 may adjust the target cadence such that the higher the past engagement level of the consumer, the greater the increase in target cadence and the lower the past engagement level of the consumer, the greater the decrease in target cadence for the consumer. In a similar way, the analytical model 104 may determine not to adjust the target cadence for the consumer for certain values or value ranges of the past engagement level of the consumer.

By accounting for past engagement level, the analytical model 104 may, for example, tune the target cadence to increase the rate and/or number of electronic promotion correspondence sent to the consumer while maintaining a target engagement level, maximizing revenue, optimizing the consumer experience, or according to any other cadence goal (more of which are discussed in detail below).

The analytical model 104 may adjust the target cadence indicator of a consumer based on a time factor (212). The analytical model 104 may increase the target cadence of the consumer during a particular time period, such as during a time period of increased consumer spending, including as examples "Black Friday" weekend, which refers to the weekend after the Thanksgiving holiday, the Christmas holiday season, which may include December 1-25, February 7-14 in advance of Valentine's day, within 2 weeks of a consumer's birthday, or other specified periods of time. The analytical model 104 may increase the target cadence by a set or consistent value throughout the time period or on a sliding scale basis (e.g., increasing the target cadence during as a particular date such as Christmas or period approaches). In adjusting the target cadence, the analytical model 104 may apply a linear increase, a plateau increase (e.g., steps), or an increase according to any other function or determination. As another example, the analytical model 104 may increase the target cadence during a time period of increased consumer engagement, such as the first 30 days after the consumer activates an account with the promotion program offering system 102, during the first 2 months the consumer enrolls to receive electronic promotion correspondence, during summer months for consumers identified as students (e.g., via a consumer attribute), and more.

The analytical model 104 may also decrease a target cadence of a consumer according to a time factor, such as during a particular time period. Examples may include time periods of decreased consumer spending, consumer engagement level, etc.

Continuing the examples of target cadence adjustment factors, the analytical model 104 may adjust the target cadence indicator for a consumer based on one or more cadence goals (213). The cadence goal may be user-specified or configured, such as by an operator or administrator of the promotion program offering system 102. A cadence goal may include business goals or rules that may be related or unrelated to a particular consumer or electronic promotion correspondence generated for the consumer. As examples, cadence goals include increasing revenue (e.g., maximizing margins on purchased promotions by a particular consumer, one or more consumer groupings, the entire set of consumers, etc.), decreasing an unsubscription probability of the consumer, increasing a number of promotions purchased by the consumer, increasing consumer engagement in a particular business unit, communication channel, promotion class, category, or subcategory, increasing consumer activations, etc.

The analytical model 104 may tune the target cadence for one or more consumers based on a particular cadence goal or adjust (increase or decrease) the target cadence for one or more consumers when changing from a first cadence goal to a second cadence goal. For example, the target cadence for a revenue maximization cadence goal (e.g., effectuated through greater rate of sending correspondence) may be higher than the target cadence for a decrease unsubscription cadence goal (e.g., effectuated ensuring correspondence sending rate does not exceed or fall within a range of an oversaturation threshold). The analytical model 104 may also account for and/or prioritize between different cadence goals by assigning weights to each cadence goal when determining or adjusting the target cadence indicator for a consumer.

The analytical model 104 may additionally or alternatively adjust the target cadence indicator for a consumer based on feedback data collected from other consumers (214). As discussed above, the analytical model 104 may access or obtain feedback data for other consumers. The feedback data may include cadence data with respect to other consumers sharing one or more common consumer attributes with the consumer. The feedback data may also specify engagement level of the other consumers, including correspondence access rates, promotion purchase rates, purchased promotion value, or values for any other engagement level metrics. The analytical model 104 may adjust the target cadence for the consumer to match, skew towards, or skew away from the target or actual cadence applied to one or more of the other consumers. The analytical model 104 may also predict how the consumer may respond to an adjusted target cadence based on how other similar consumers (e.g., with matching tuple of consumer attribute(s)) responded to the adjusted target cadence.

While exemplary adjustment factors were presented above, the analytical model 104 may adjust the target cadence indicator of a consumer according to any combination of additional or alternative factors. The analytical model 104 may adjust a consumer's target cadence based on any combination of the factors discussed above on a periodic basis (e.g., every two weeks), in response to certain scenarios or conditions, upon user request (e.g., an operator of the promotion program offering system 102), etc. The analytical model 104 may maintain separate adjustment schedules for different adjustment factors as well, e.g., a first periodic adjustment schedule for adjustments based on past engagement level of the consumer, a second aperiodic adjustment schedule for adjustments based on a time factor during an associated time period, and a third user-specified adjustment schedule for adjustments based on a changing cadence goal. The analytical model 104 may store the adjusted target cadence (216), e.g., for use when determining whether to send an electronic promotion correspondence to a consumer.

Figure 3:
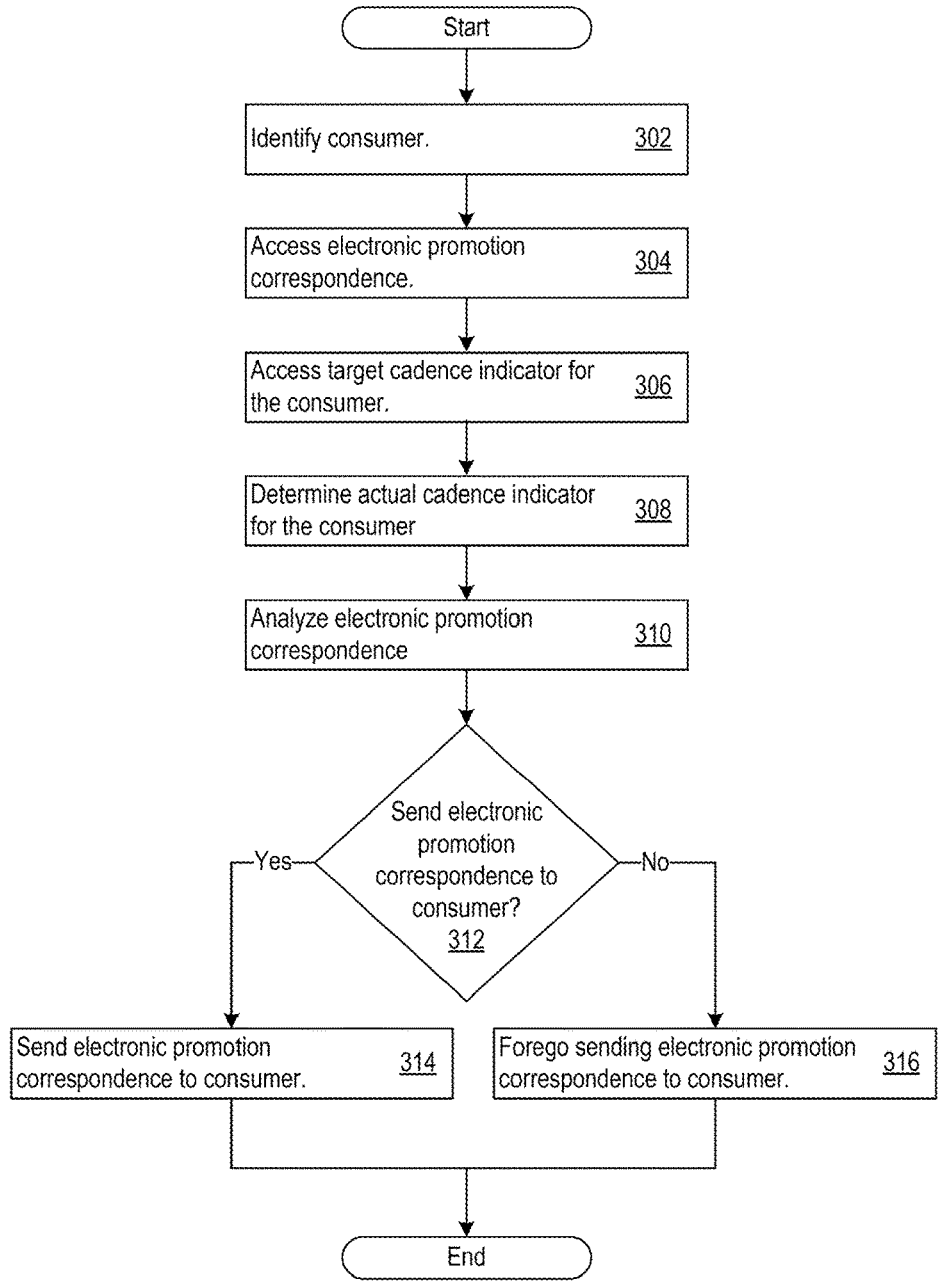
FIG. 3 shows an example of logic for determining whether to send an electronic promotion correspondence to a consumer.

FIG. 3 shows an example of logic 300 for determining whether to send an electronic promotion correspondence to a consumer. The logic 300 may be implemented in hardware, software, or a combination of both. For example, the analytical model 104 may implement the logic 300 as software to send electronic promotion correspondence to the consumer based on a target cadence.

The analytical model 104 may identify a consumer (302) and access an electronic promotion correspondence (304). The electronic promotion correspondence may have been generated specifically for the consumer by the analytical model 104 or other components, logic, or circuitry of the promotion program offering system 102. Alternatively, the electronic promotion correspondence may have been generated for a selected set, grouping, or cohort of consumers, such as a consumer grouping that shares one or more common consumer attributes.

The analytical model 104 accesses a target cadence indicator for the consumer (306), such as by retrieving the target cadence indicator from a memory of the analytical model 104 or an accessible database (e.g., the consumer profiles database 112). The analytical model 104 determines an actual cadence indicator for the consumer (308). An actual cadence indicator may refer to any indication of an actual cadence for electronic promotion correspondence sent to the consumer. The analytical model 104 may determine the actual cadence indicator for the consumer over a predetermined period of time, such as the previous two weeks, the previous 6 months, or the lifetime of the consumer during which the consumer received electronic promotion correspondence from the promotion program offering system 102.

In one implementation, the analytical model 104 determines the actual cadence indicator for the consumer over a specified time period to minimize variance between a target cadence and the actual cadence of the user. In one particular example, a consumer may have a target cadence of 3.0 correspondences per week. The actual cadence for the 3 year enrollment lifetime of the consumer may be 2.9 correspondences per week, as lesser variance from a target cadence may occur as the specified period of time increase. However, in a shorter time period of the past two weeks, the consumer may have received 2 total electronic promotion correspondences, thus having an actual cadence of 1.0 correspondences per week for the past two weeks. To decrease the variance of the actual cadence of the consumer from the target cadence, the analytical model 104 may use the actual cadence indicator for the past 2 weeks (e.g., 1.0 correspondences per week) in determining whether to send the consumer an electronic promotion correspondence. In one variation, the specified time period to determine the actual cadence indicator is across a multiple of the periodicity of the target cadence of the consumer (or a rounded value based on the multiple). For example, when the target cadence of a consumer can be represented as one electronic promotion correspondence sent every 3.1 days, then the analytical model may determine the actual cadence indicator for the consumer for the previous 3.1 days (or rounded down to 3 or up to 4 days), 6.2 days, 9.3 days, or rounded values thereof.

The analytical model 104 may analyze the electronic promotion correspondence (310). The analytical model 104 may determine an analysis score from analyzing the electronic promotion correspondence. In some implementations, the analytical model 104 may assess the strength or weakness of one or more promotions included in the electronic promotion correspondence, e.g., as measured according to one or more of the cadence goals. In some implementations, the analytical model 104 accesses promotion scores for one or more of the promotions included in the electronic promotion correspondence. The promotion score may be indicative of a probability that the consumer accepts (e.g., purchases) the promotion. As previously mentioned, a promotion score for a promotion may be generated according to U.S. application Ser. No. 13/411,502, incorporated by reference herein in its entirety. The analytical model 104 may determine the analysis score for the electronic promotion correspondence based on the one or more promotion scores.

When analyzing the electronic promotion correspondence, the analytical model 104 may adjust a promotion score to account for any number of promotion factors. For example, the analytical model 104 may increase or decrease the promotion score of a promotion based on remaining inventory or availability of the promotion, e.g., increase the promotion score when the remaining inventor or available promotions exceeds an inventory threshold to increase the likelihood of sending the electronic promotion correspondence including the promotion. The analytical model 104 may also similarly adjust a promotion score based on remaining time the promotion is being offered or according to other factors. In a similar way, the analytical model 104 may collectively adjust the promotion scores for multiple promotions, e.g., part of a promotion collection.

The analytical model 104 may analyze the electronic promotion correspondence and determine an analysis score by applying any number of functions or mathematical analysis to promotion scores of the promotions included in the electronic promotion score. In one example, the analytical model 104 determines the analysis score as a weighted mean of the promotion scores (or adjusted promotion scores) for the electronic promotion correspondence. In this example, the analytical model 104 may weight the promotion scores for promotions included in an electronic promotion correspondence such that the best (e.g., highest probability) promotion score is assigned the highest weighted value, and each lower promotion score is assigned a progressively lower weighted value. Then, the analytical model 104 may determine a weighted mean score is generated by averaging the weighted promotion scores.

Any number of additional or alternative mathematical analyses of one or more promotion scores by the analytical model 104 is contemplated. For instance, the analytical model 104 may sum the promotion scores of an electronic promotion correspondence, generate a weighted sum of the promotion scores by summing each weighted promotion score, obtain a mean promotion score by averaging the promotion scores for some, or all, of the promotions included in the electronic promotion correspondence, determining a median promotion score or local maximum promotion, performing standard deviation analysis, and more. The analytical model 104 may identify any of the above-mentioned mathematical results as the analysis score.

The analytical model 104 determines whether to send the electronic correspondence to the consumer (312) based on the target cadence indicator, actual cadence indicator, and the analysis of the electronic promotion correspondence. In one variation, the analytical model 104 compares the difference between the target cadence indicator and the actual cadence indicator with the analysis of the electronic promotion correspondence. When the actual cadence indicator is less than the target cadence indicator, the analytical model 104 may increase the likelihood that the electronic promotion correspondence is sent to the consumer, for example by lowering the score threshold that the analysis score of the electronic promotion correspondence must exceed to warrants ending the electronic promotion correspondence. On the other hand, when the actual cadence indicator is greater than the target cadence indicator, the analytical model 104 may decrease the likelihood that the electronic promotion correspondence is sent to the consumer, for example by increasing the score threshold that the analysis score of the electronic promotion correspondence must exceed to warrant sending the electronic promotion correspondence. Put another way, the analytical model 104 may adjust the requisite strength (e.g., probability of acceptance for promotions in the electronic promotion correspondence) for sending the electronic promotion correspondence depending on the difference (and the degree of the difference) between a targeted and actual cadence indicator for the consumer.

The analytical model 104 may determine to send the electronic promotion correspondence to the consumer when the analysis score associated with the electronic promotion correspondence meets a cadence criterion, which may vary depending on the difference and degree of difference between the target and actual cadence indicator for the consumer. Non-limiting examples of cadence criterion include exceeding a score threshold, falling below a score threshold, falling within a predetermined range of the score threshold, or according to any other configurable cadence criterion.

The analytical model 104 sends the electronic promotion correspondence to the consumer (314) when determined to do so. If not, the analytical model 104 foregoes sending the electronic promotion correspondence to the consumer (316). When the analytical model 104 foregoes sending the electronic promotion correspondence to the consumer, the actual cadence indicator for the consumer may decrease and accordingly increase the likelihood that a subsequent determination will result the analytical model 104 sending an electronic promotion correspondence to the consumer.

The analytical model 104 may perform the steps described in the logic 300 (or any other logic described herein) at predetermined times or in response to a performance condition. For example, the analytical model 104 may perform the logic 300 once per day, once every 12 hours, in response to identifying the availability of a generated electronic promotion correspondence for the consumer, in response to receiving a generated electronic promotion correspondence for the consumer, after a predetermined amount of time has elapsed since sending a previous electronic promotion correspondence (which may vary according to the target cadence indicator of the consumer), in response to receiving an indication that the consumer is in a predetermined location, and more.

While the logic 200 was described in connection with determining whether to send an electronic promotion correspondence to a particular consumer, similar logic may be applied to determine whether to send an electronic promotion correspondence to a consumer grouping. In that regard, the consumer grouping may share a common target cadence indicator, and the analytical model 104 may determine a consumer-group-specific cadence indicator, e.g., as an average, weighted mean, maximum, minimum, mode, sum, or other calculation for one or more consumer factors of the consumer group (e.g., number of electronic promotion correspondence sent to each consumer in the consumer group).

The analytical model 104 may control the sending of promotion correspondence for different classes of electronic promotion correspondence. A promotion class may refer to any configurable categorization of promotions set by the promotion program offering system 102. For example, the analytical model 104 may specify promotions for products or goods as belonging to a first promotion class (e.g., "goods" promotions). As another example, the analytical model 104 may specify time-sensitive promotions as belonging to particular promotion class (e.g., "deal-of-the-day" promotions) and travel-related promotions as belonging to a different promotion class (e.g., "getaway" promotions). Any number of additional or different classifications may be employed by the analytical model 104.

In some implementations, the analytical model 104 may maintain an overall target cadence for a consumer, but account for the past engagement level of the consumer for electronic promotion correspondences of particular promotion classes, categories, or subcategories. The analytical model 104 may adjust the analysis score for an electronic promotion correspondence of a particular promotion class to account for the consumer's past engagement level (e.g., affinity) to the correspondences of that particular promotion class.

As one example, Chart 1 below shows engagement data of different promotion classes for a particular consumer as determined over a time period of one week: Table

TABLE 1

| | Promotion Class 1 | Promotion Class 2 | Promotion Class 3 | Promotion Class 4 |
|---|---|---|---|---|
| Actual Cadence | 6/7 | 1/7 | 1/7 | 4/7 |
| Target Cadence | 7/7 | 3/7 | 1/7 | 4/7 |
| Analysis Score Adjustment | 1.0 | 1.1 | 0.1 | 0.8 |
| Initial Score | 0.8 | 0.6 | 0.8 | 0.7 |
| Adjusted Score | 0.8 | 0.66 | 0.08 | 0.56 |

The analytical model 104 may determine an adjustment factor to the analysis score of an electronic promotion correspondence of a particular promotion class based on the past engagement level of the consumer for the particular promotion class (shown in Chart 1 as Analysis Score Adjustment). The adjustment factor may not necessarily be a linear increase or decrease with respect to the past engagement level of the consumer for the predetermined time period. The initial score may refer to an analysis score associated with a particular electronic promotion correspondence before applying an adjustment factor for a particular promotion class. The adjusted score may account for the adjustment factor (e.g., by multiplying with the promotion or analysis score of an electronic promotion correspondence by the adjustment factor). In this way, the analytical model 104 may account for the consumer's affinity (e.g., engagement or response level) to correspondences of the particular promotion class. The analytical model 104 may compare the adjusted score with a threshold value associated with or representative of the overall target cadence of the consumer.

As other variations, the analytical model 104 may separately determine whether to send electronic promotion correspondence depending on a particular communication channel through which the electronic promotion correspondence is sent. As one example, the analytical model may maintain an e-mail target cadence indicator for promotions sent to a consumer through e-mail and a separate SMS target cadence indicator for promotions sent to the consumer through SMS. Additionally or alternatively, the analytical model 104 may maintain a target cadence for multiple communication channels, and selectively determine a particular communication channel to communicate the electronic promotion correspondence through.

Figure 4:
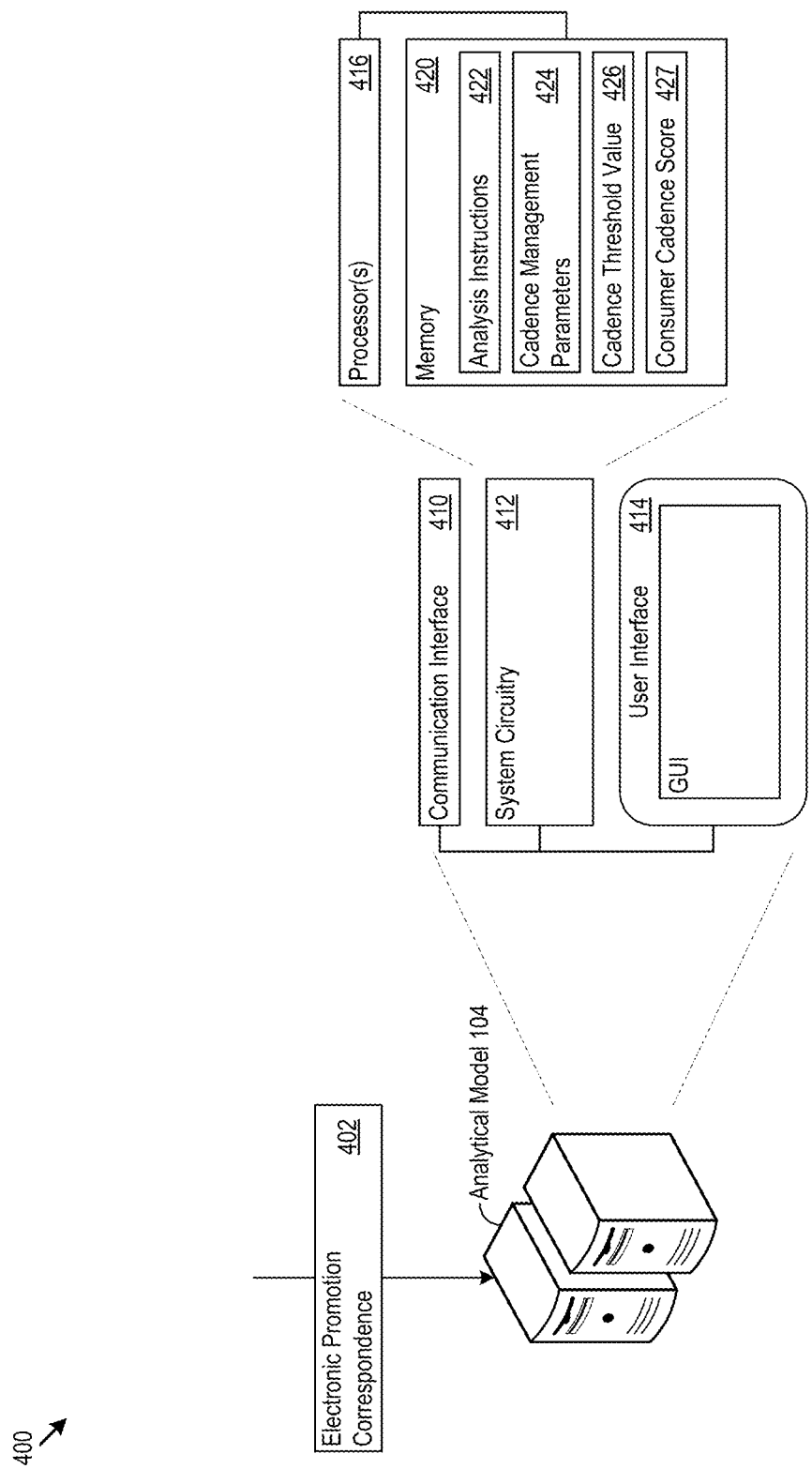
FIG. 4 shows an example of a system for managing the cadence of electronic promotion correspondence sent to one or more consumers.

FIG. 4 shows an example of a system 400 for managing the cadence of electronic promotion correspondence sent to one or more consumers. The system 400 provides one exemplary implementation of a target cadence indicator through a cadence threshold value, as presented in greater detail below.

The system 400 includes the analytical model 104, which receives an electronic promotion correspondence 402 and determines whether to send the electronic promotion correspondence 402 to the consumer using the cadence threshold value. The analytical model 104 may include a communication interface 410, system circuitry 412, and a user interface 414. The system circuitry 412 of the analytical model 104 may perform any functionality associated with the analytical model 104, including any combination of the cadence management processes and sending determinations for electronic promotion correspondence described above and below. In one implementation, the system circuitry 412 includes one or more processors 416 and a memory 420. The memory 420 may store analysis instructions 422, cadence management parameters 424, a cadence threshold value 426 for a consumer, and a cadence score 427 for the consumer.

In operation, the system circuitry 412 receives the electronic promotion correspondence 402 for a consumer, access the cadence threshold value 427, determines a cadence score 427 for the consumer, and determines whether to send the electronic promotion correspondence 402 to the consumer based on a comparison of the cadence threshold value 426 and the cadence score 427 for the consumer. The cadence management parameters 424 may specify any parameters and/or cadence criteria used by the analytical model 104 to access, determine, or adjust the cadence threshold value 426, the cadence score 427 for a consumer, or both. As described in greater detail below, the analytical model 104 may implement the cadence threshold value 426 to be a numerical value and as threshold to exceed in order to send the electronic promotion correspondence 402 to the consumer. The cadence score 427 may incorporate the actual cadence indicator of a consumer, analysis score associated with the electronic promotion correspondence 402, or both.

Figure 5:
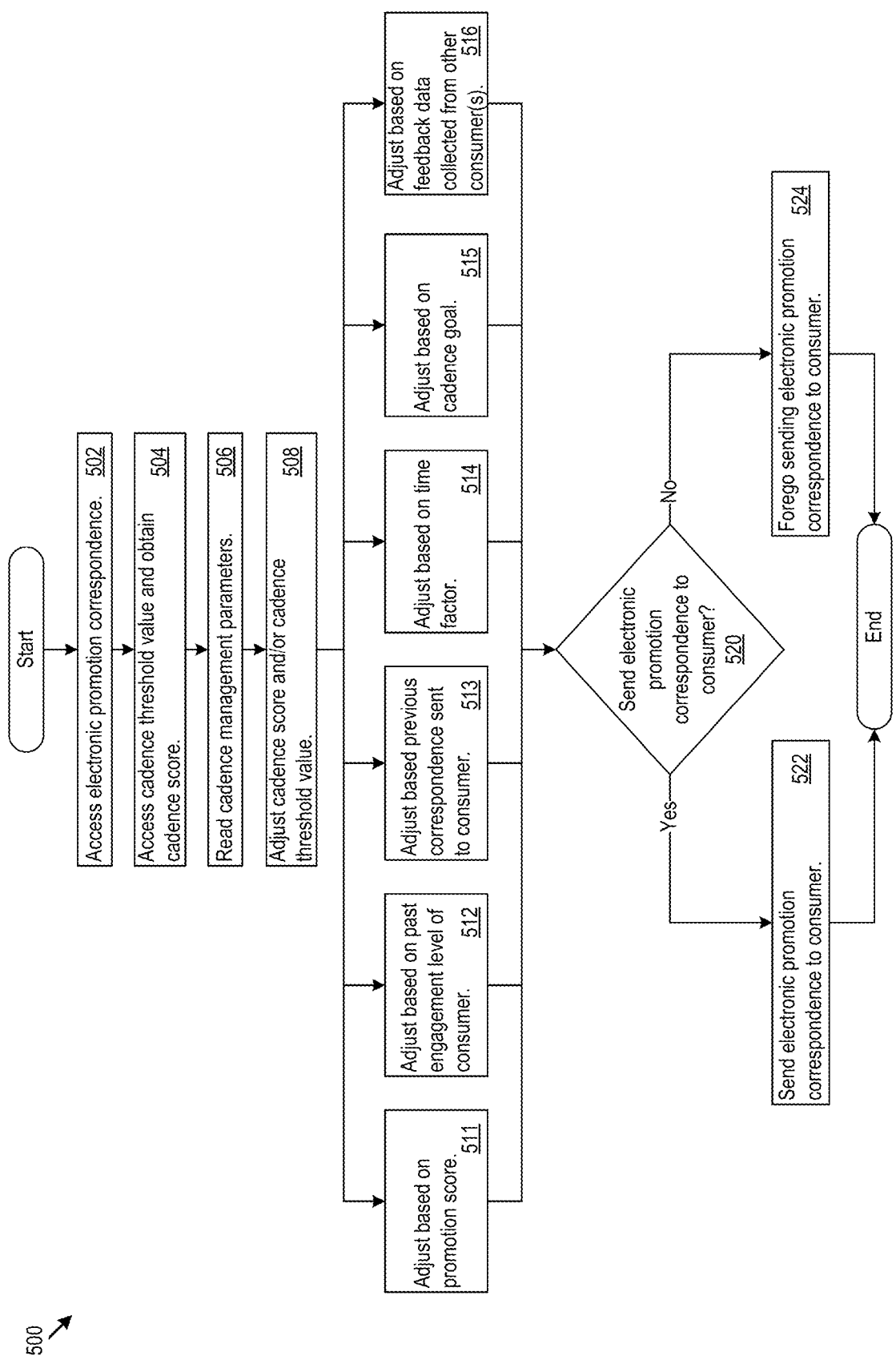
FIG. 5 shows an example of logic for determining whether to send an electronic promotion correspondence to a consumer using a cadence threshold value.

FIG. 5 shows an example of logic 500 for determining whether to send an electronic promotion correspondence to a consumer using a cadence threshold value. The logic 500 may be implemented in hardware, software, or a combination of both. For example, the analytical model 104 may implement some or all of the steps described in the logic 500 as software.

The analytical model 104 accesses an electronic promotion correspondence 402 for a consumer (502). For example, the analytical model 104 may receive the electronic promotion correspondence 402 from other logic, circuitry, or components of the analytical model 104 or the promotion program offering system 102. The analytical model 104 also accesses a cadence threshold value 426 and obtains a cadence score 427 for a consumer (504). In doing so, the analytical model 104 may employ any of the above-described methods or processes discussed with respect to accessing or determining a target cadence indicator, an actual cadence indicator, or analyzing an electronic promotion correspondence. The analytical model 104 may also employ any of the methods or processes described in U.S. Provisional Application No. 61/666,556, e.g., as described for determining an e-mail score or performing supplemental analysis.

The analytical model 104 may implement the cadence threshold value 426 and the cadence score 427 in various ways, which may be specified by the cadence management parameters 424. In a first example, the cadence threshold value 426 specifies a global threshold that must be exceeded for before the analytical model 104 determines to send an electronic promotion correspondence. The global threshold may correspondence to an overall cadence of electronic promotion correspondence sent to the consumer. The analytical model 104 may implement the cadence score 427 to account for all other factors relevant to an electronic promotion correspondence, including actual cadence, the consumer's past engagement level, including the consumer's specific engagement level for previously sent correspondences including particular promotion category or subcategory, of a particular promotion class, or other categorization of the electronic promotion correspondence.

As another example, the analytical model 104 may implement the cadence threshold value 426 to be indicative of a target cadence of the consumer, e.g., as described above with respect to the target cadence indicator. Accordingly, the analytical model 104 may determine or adjust the cadence threshold value 426 based on any of the target cadence adjustment factors discussed above. In this example, the analytical model 104 may then implement the cadence score 427 to be a value that accounts for the actual cadence of a consumer (e.g., through an actual cadence indicator), the promotion strength of the electronic promotion correspondence 402 (e.g., through an analysis score), or both. As a second example, the analytical model 104 may implement the cadence score 427 to be reflect the strength of the electronic promotion correspondence 402 and the cadence threshold value 426 to account for any other factors that may affect whether to send or the cadence at which electronic promotion correspondence is sent to the consumer, including target cadence, actual cadence, and more.

The analytical model 104 may implement the cadence threshold value 426 and the cadence score 427 to support a direct or indirect comparison between the values. The analytical model 104 may utilize any number of translation, normalization, implementation methods, or other data processing models or techniques to allow for a comparison between the cadence threshold value 426 and the cadence score 427. The analytical model 104 may compare the cadence threshold value 426 with the cadence score 427 for the consumer when determining whether to send the electronic promotion correspondence 402 to the consumer. In that regard, it may be understood that for a particular comparison, the analytical model 104 may effectuate an identical change to the likelihood in sending the electronic promotion correspondence 402 through adjustment to the cadence threshold value 426 (e.g., increase of 5) or through a corresponding adjustment to the cadence score 427 (e.g., a decrease of 5). The analytical model 104 reads the cadence management parameters 224 (506) to determine which respective adjustment factors are applicable to or associated with the cadence threshold value 426 and the cadence score 427.

The analytical model 104 may adjust the cadence threshold value 426, cadence score 427, or both (508). Example adjustments include the adjustments described above based on one or more promotion scores in the electronic promotion correspondence (511), based on a past engagement level of the consumer over a predetermined period of time (512), based on a number or cadence of previous electronic promotion correspondence sent to the consumer (513), based on a time factor (514), based on one or more cadence goals or cadence goal changes (515), based on feedback data collected from other consumers (516), and more.

One particular implementation of the cadence threshold value 426 and the cadence score 427 is presented next. Many others are contemplated. In this particular implementation, the analytical model 104 identifies or determines the cadence threshold value 426 as a target number of electronic promotion correspondences sent to a particular consumer in a week (e.g., a cadence threshold value 426 of 4.5 indicates a target of 4.5 correspondences sent in a week). The analytical model 104 may adjust the cadence threshold value 426 to account for any number of adjustment factors associated with a target cadence for the consumer, including based on feedback of other consumers, tuning based on the consumer's past engagement level, according to a time factor, or a cadence goal change, for example. The analytical model 104 may determine an adjusted cadence threshold value of 5.1 based on a high past engagement level of the consumer and cadence goal for increasing revenue.

Continuing description of this particular implementation, the analytical model 104 may implement the cadence score 427 of the consumer as an analysis score of an analyzed electronic promotion correspondence adjusted based on the actual cadence of the consumer for the past 7 days. The analytical model 104 may configure the determination of or translate an analysis score to allow for comparison with the cadence threshold value 426. The analytical model 104 may adjust the analysis score according to the number of electronic promotion correspondence sent to the consumer during the past 7 days. As one example, the analytical model 104 may increment the analysis score for each day (or other configurable time period) that electronic promotion correspondence was not sent to the consumer (thus understood to increase the likelihood of surpassing the cadence threshold value 426 and sending the electronic promotion correspondence 402 to the consumer) and decrement the analysis score for each day (or other configurable time period) that electronic promotion correspondence was sent to consumer.

The analytical model 104 may configure the increment and decrement amounts such that the net adjustment skews the cadence score 427 to increase when the actual cadence is lower than the target cadence specified by the cadence threshold value 426 and vice versa. Along similar lines, the analytical model 104 may configure the increment and decrement amounts such that the increment and decrement amounts result in a net change of 0 when the actual cadence of the consumer is equal to the target cadence. As an alternative, the analytical model 104 may map the actual cadence of the past 8 days to a particular adjustment value, which may be through a linear mapping, non-linear mapping, or by applying any other mapping function to the actual cadence of the use.

After determining the cadence threshold value 426 and the cadence score 427 for a consumer (which may include adjustments), the analytical model 104 determines whether to send the electronic promotion correspondence 402 to the consumer (520), including in any of the methods described above. The analytical model 104 may determine to send the electronic promotion correspondence 402 when the cadence score 427 exceeds the cadence threshold value 426, is within a predetermined range of the cadence threshold value 426, or according to any other configurable comparison criterion.

The analytical model 104 sends the electronic promotion correspondence to the consumer (522) when determined to do so. If not, the analytical model 104 foregoes sending the electronic promotion correspondence to the consumer (524).

Figure 6:
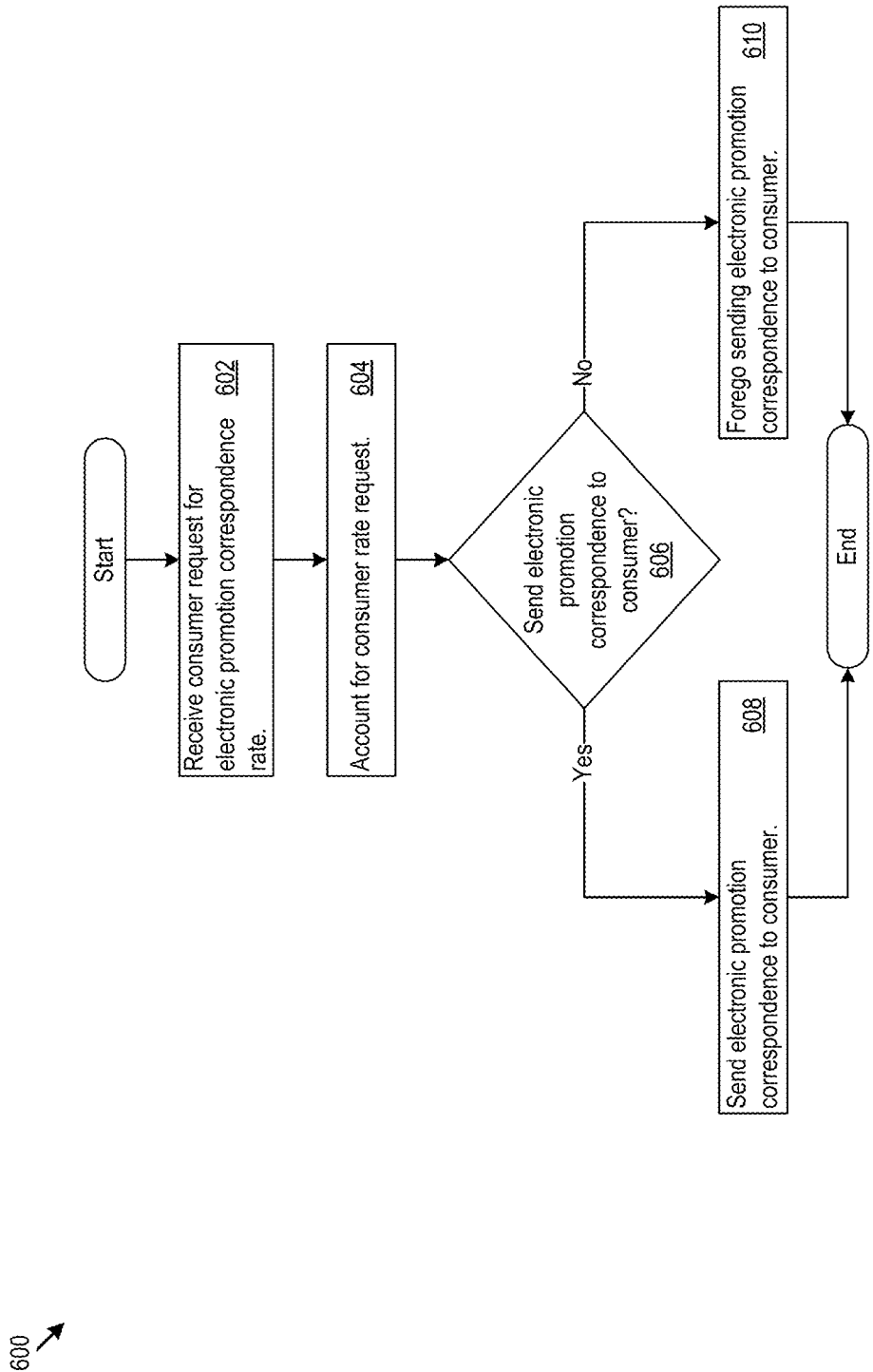
FIG. 6 shows an example of logic for determining whether to whether to send an electronic promotion correspondence to a consumer.

FIG. 6 shows an example of logic 600 for determining whether to whether to send an electronic promotion correspondence to a consumer. The logic 600 may be implemented in hardware, software, or combination of both. For example, the analytical model 104 may implement some or all of the steps described in the logic 600 as software.

The analytical model 104 may receive a request from a consumer specifying a particular cadence (e.g., electronic promotion correspondence rate) for electronic promotion correspondence sent to the consumer. The consumer may communicate the request to the promotion program offering system 102 across any number of communication channels using one or more networks. The request may specify an electronic promotion correspondence rate or cadence for a particular class of promotions (e.g., deal-of-the-day correspondences, travel-based promotion correspondences, goods related promotion correspondences). The analytical model 104 may account for the consumer request (604) when determining whether to send electronic promotion correspondence to the consumer (606).

The analytical model 104 may account for the consumer rate request in multiple ways, which may be specified in the cadence management parameters 424. The analytical model 104 may send electronic promotion correspondence in direct accordance with the consumer rate request. For example, when the consumer requests an electronic promotion correspondence rate of one promotion mail per week, the analytical model 104 may limit sending of promotion e-mails to the consumer to a particular day of the week.

In one variation, the analytical model 104 may send electronic promotion correspondence to the consumer at maximum cadence of the consumer requested rate, e.g., as measured over the activation lifetime of the consumer or over a predetermined time period. In that regard, the analytical model 104 may send electronic promotion correspondence at a rate less than the specified consumer request. The analytical model 104, may for example, identify a time period corresponding to the consumer requested rate has elapsed since a previous electronic promotion correspondence was sent to the consumer (e.g., 6 days have passed when the consumer requested rate is 1.0 electronic promotion correspondence per week). Then, the analytical model 104 may determine whether to send an electronic promotion correspondence to the consumer, e.g., according to any of the determination processes described above.

In another variation, the analytical model 104 may send electronic promotion correspondence to the consumer at a rate that exceeds the consumer requested rate when one or more exception criteria are met. The exception criteria may be specified in the cadence management parameters 424. For example, the analytical model 104 may determine to send an electronic promotion correspondence that exceeds a consumer requested rate (e.g., more than once a week) when the past engagement level of the consumer exceeds or meets a particular threshold (e.g., 100% engagement level for multiple metrics), when one or more promotion scores of an electronic promotion correspondence exceed a particular score threshold, when the value of a promotion included in the electronic promotion correspondence exceeds a particular value threshold, and the like. The exception criteria may be operator specified, and/or maybe configured such that they are met only in extreme circumstances so as to avoid violating the consumer requested correspondence rate unless an exceptional circumstance arises (e.g., availability of an exception promotion for the consumer).

The analytical model 104 sends the electronic promotion correspondence to the consumer (608) when determined to do so. If not, the analytical model 104 foregoes sending the electronic promotion correspondence to the consumer (610).

Figure 7:
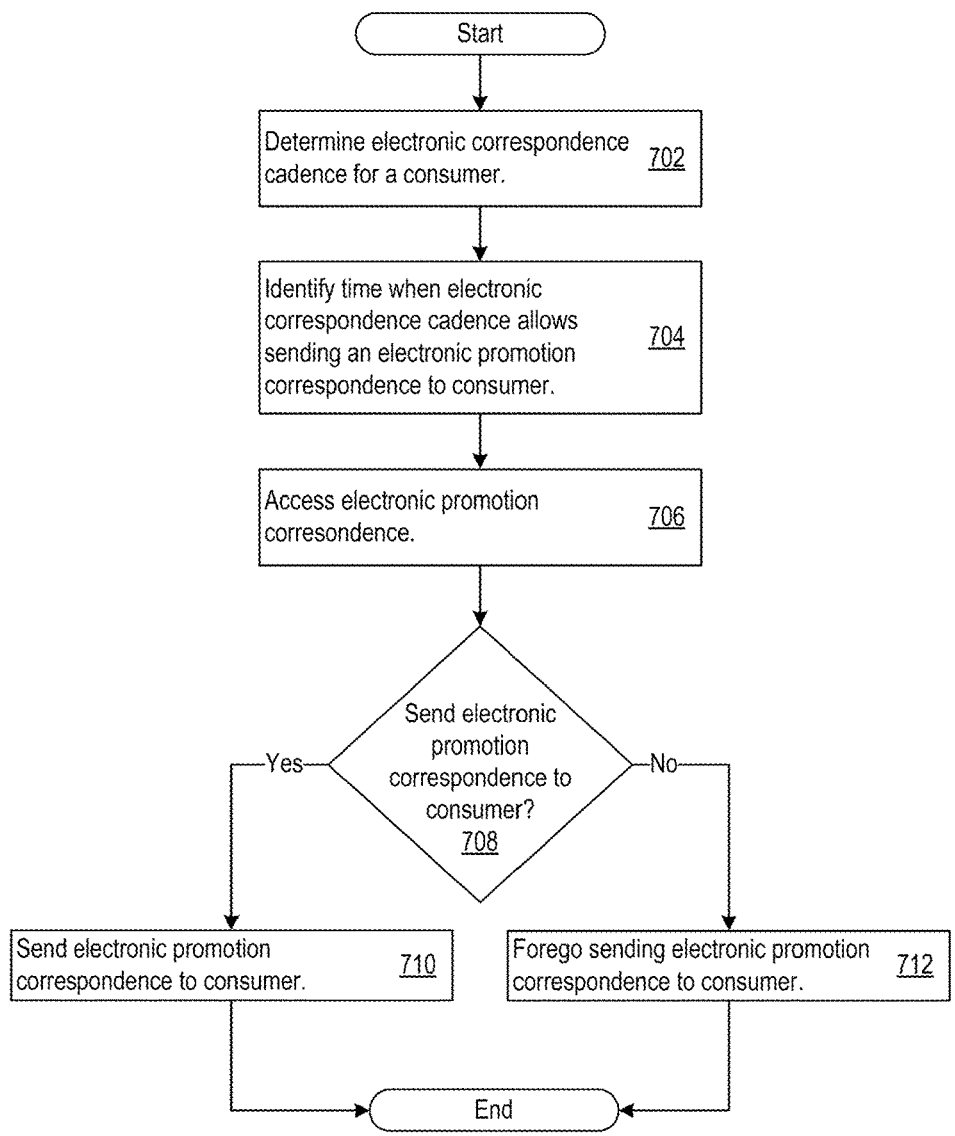
FIG. 7 shows an example of logic for determining whether to whether to send an electronic promotion correspondence to a consumer according to an electronic correspondence cadence for the consumer.

FIG. 7 shows an example of logic 700 for determining whether to whether to send an electronic promotion correspondence to a consumer according to an electronic correspondence cadence for the consumer. The logic 700 may be implemented in hardware, software, or combination of both. For example, the analytical model 104 may implement some or all of the steps described in the logic 700 as software. The logic 700 presents an additional or alternative variance in managing the cadence for electronic promotion correspondence sent to a consumer.

The analytical model 104 may determine the electronic correspondence cadence for a consumer (702), which may represent a target cadence for the consumer. The analytical model 104 may access the cadence from a memory or database, determine the cadence based on feedback data from other consumers, or in other ways. The analytical model 104 may also adjust the cadence according any adjustment factor, such as those presented above.

The analytical model 104 may limit when an electronic promotion correspondence sending determination is performed based on the determined electronic correspondence cadence of the consumer. In that regard, the analytical model 104 may identify an allowed time when the electronic correspondence cadence specifies or permits sending of an electronic promotion correspondence (704), e.g., such that sending the electronic promotion correspondence will not exceed the electronic correspondence cadence.

The analytical model 104 may identify the allowed time based on whether sending the electronic promotion correspondence will violate (e.g., exceed) the electronic correspondence cadence over a predetermined period of time (e.g., over one or more periodic cycles of the cadence, over the past 7 days, over the past 6 months, over the time since the previous one or any other determined number of electronic promotion correspondence was sent, etc.). For example, when the electronic correspondence cadence of the consumer specifies sending one electronic promotion correspondence every three days, the analytical model 104 may identify an allowed time when two or more days have elapsed since a previous electronic promotion correspondence was sent to the consumer. As another example, the analytical model 104 may determine the allowed time over two periodic cycles of the cadence (e.g., 6 days). In this example, when the analytical model 104 has previously sent electronic promotion correspondence to the consumer on day 1 and day 4, the analytical model 104 may identify day 6 as an allowed time to send an electronic promotion correspondence to the consumer, as doing so would not violate or exceed the electronic correspondence cadence for the consumer.

Upon identifying an allowed time, the analytical model 104 may access an electronic promotion correspondence 402 (706) and determine whether to send the electronic promotion correspondence 402 to the consumer (708) in any of the ways described herein. The analytical model 104 sends the electronic promotion correspondence to the consumer (710) when determined to do so. If not, the analytical model 104 foregoes sending the electronic promotion correspondence to the consumer (712).

The analytical model 104 may perform the steps described in the logic 700 (or any other logic described herein) at predetermined times or in response to a performance condition. For example, the analytical model 104 may perform the logic 700 once per day, once every 12 hours, in response to identifying the availability of a generated electronic promotion correspondence for the consumer, in response to receiving a generated electronic promotion correspondence for the consumer, after a predetermined amount of time has elapsed since sending a previous electronic promotion correspondence, and more. In one variation, the analytical model 104 performs the logic 700 at a higher rate or increased frequency in response to or after foregoing sending the electronic promotion correspondence 402 to the consumer than after sending the electronic promotion correspondence to the consumer.

Figure 8:
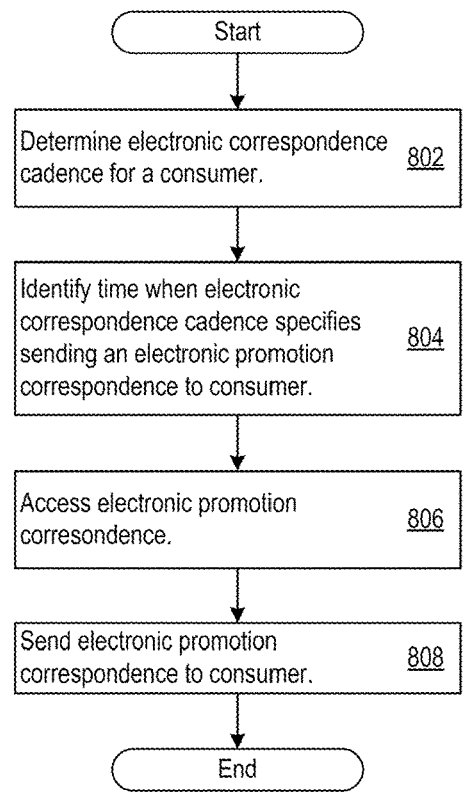
FIG. 8 shows an example of logic for determining whether to whether to send an electronic promotion correspondence to a consumer according to an electronic correspondence cadence for the consumer.

FIG. 8 shows an example of logic 800 for determining whether to whether to send an electronic promotion correspondence to a consumer according to an electronic correspondence cadence for the consumer. The logic 800 may be implemented in hardware, software, or combination of both. For example, the analytical model 104 may implement some or all of the steps described in the logic 800 as software. The logic 800 presents an additional or alternative variance in managing the cadence for electronic promotion correspondence sent to a consumer.

The analytical model 104 may determine the electronic correspondence cadence for a consumer (802) and identify an allowed time for sending an electronic promotion correspondence (804) in a consistent manner as described above. Upon identifying an allowed time, the analytical model 104 may access an electronic promotion correspondence (806) and send the electronic promotion correspondence (808). In this regard, the analytical model 104 may send electronic promotion correspondence directly in accordance with the electronic correspondence cadence. For example, when the electronic correspondence cadence specifies sending an electronic promotion correspondence every 3.0 days, then the analytical model 104 may do so.

The analytical model 104 may perform the logic 800 at predetermined times that may affect whether analytical model 104 can directly comply with the electronic correspondence cadence. For example, when the analytical model 104 performs the logic 800 once a day and the electronic correspondence cadence specifies sending an electronic promotion correspondence once every 3.2 days, the analytical model 104 may identify the time to comply with (e.g., not exceed) the electronic correspondence cadence over a time period (e.g., over 7 days or, e.g., over 32 days, which represents 10 periodic cycles of the electronic promotion cadence).

Methods and systems for managing the cadence of electronic promotion correspondence sent to one or consumers are presented herein. The present disclosure contemplates any combination of any portion of the disclosed methods, including the score determination processes, supplemental analysis processes, and disclosure of U.S. Provisional Application No. 61/666,556.

The present disclosure contemplates a computer-readable medium that includes instructions or receives and executes instructions responsive to a propagated signal, to implement one or more of the systems and methods described herein. Further, the instructions can be transmitted or received over the network via a communication interface. The communication interface can be a part of the processor or can be a separate component. The communication interface can be created in software or can be a physical connection in hardware. The communication interface can be configured to connect with a network, external media, the display, or any other components in system, or combinations thereof. The connection with the network can be a physical connection, such as a wired Ethernet connection or can be established wirelessly as discussed below. In the case of a service provider server, the service provider server can communicate with users through the communication interface.

The computer-readable medium can be a single medium, or the computer-readable medium can be a single medium or multiple media, such as a centralized or distributed database, or associated caches and servers that store one or more sets of instructions. The term "computer-readable medium" can also include any medium that can be capable of storing, encoding or carrying a set of instructions for execution by a processor or that can cause a computer system to perform any one or more of the methods or operations disclosed herein.

The computer-readable medium can include a solid-state memory such as a memory card or other package that houses one or more non-volatile read-only memories. The computer-readable medium also may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an email or other self-contained information archive or set of archives may be considered a distribution medium that may be a tangible storage medium. The computer-readable medium is preferably a tangible storage medium. Accordingly, the disclosure may be considered to include any one or more of a computer-readable medium or a distribution medium and other equivalents and successor media, in which data or instructions can be stored.

Alternatively or in addition, dedicated hardware implementations, such as application specific integrated circuits, programmable logic arrays and other hardware devices, may be constructed to implement one or more of the systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing may be constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments can be apparent to those of skill in the art upon reviewing the disclosure. Other embodiments can be utilized and derived from the disclosure, such that structural and logical substitutions and changes can be made without departing from the scope of the disclosure. Additionally, the illustrations are merely representational and cannot be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed is:

1. An apparatus for improving electronic correspondence transmission efficiency, the apparatus comprising a processor and a non-transitory memory storing program instructions, wherein the non-transitory memory and the program instructions are configured to, with the processor, cause the apparatus to:
   determine a target cadence indicator indicative of a target rate for transmitting electronic correspondences associated with a first client profile, wherein the non-transitory memory and the program instructions are configured to, with the processor, cause the apparatus to:
      retrieve an initial target cadence indicator associated with the first client profile,
      determine feedback data based at least in part on the first client profile, and
      calculate the target cadence indicator, via application of an analytical model, based at least in part on adjusting the initial target cadence indicator based on the feedback data;
   determine an actual cadence indicator, wherein the actual cadence indicator is indicative of an actual rate of previously transmitted electronic promotion correspondences associated with the first client profile, and wherein the non-transitory memory and the program instructions are configured to, with the processor, cause the apparatus to:
      calculate a plurality of past cadence indicators associated with the first client profile over a past cadence time period;
      calculate a plurality of cadence variances between each of the plurality of past cadence indicators and the target cadence indicator; and
      based at least in part on the plurality of cadence variances, determine one of the plurality of past cadence indicators as the actual cadence indicator;
   retrieve a first electronic correspondence associated with the first client profile; and
   in response to determining that the target rate indicated by the target cadence indicator satisfies the actual rate indicated by the actual cadence indicator, transmit the first electronic correspondence to a client device associated with the first client profile.

2. The apparatus of claim 1, wherein the feedback data is associated with a second client profile, wherein both the first client profile and the second client profile comprise at least one common attribute.

3. The apparatus of claim 1, wherein, when determining the target cadence indicator, the non-transitory memory and the program instructions are configured to, with the processor, cause the apparatus to:
   adjust the initial target cadence indicator based at least in part on past engagement level data associated with the first client profile.

4. The apparatus of claim 1, wherein, when determining the target cadence indicator, the non-transitory memory and the program instructions are configured to, with the processor, cause the apparatus to:
   adjust the initial target cadence indicator based at least in part on a time factor.

5. The apparatus of claim 1, wherein, when determining the target cadence indicator, the non-transitory memory and the program instructions are configured to, with the processor, cause the apparatus to:
   adjust the initial target cadence indicator based at least in part on a cadence goal.

6. The apparatus of claim 1, wherein the non-transitory memory and the program instructions are configured to, with the processor, cause the apparatus to:

determine a maximum cadence variance from the plurality of cadence variances, and
select a past cadence indicator from the plurality of past cadence indicators that corresponds to the maximum cadence variance as the actual cadence indicator.

7. A computer-implemented method comprising:
determining a target cadence indicator indicative of a target rate for transmitting electronic correspondences associated with a first client profile, wherein the computer-implemented method further comprises:
retrieving an initial target cadence indicator associated with the first client profile,
determining feedback data based at least in part on the first client profile, and
calculating the target cadence indicator, via application of an analytical model, based at least in part on adjusting the initial target cadence indicator based on the feedback data;
determining an actual cadence indicator, wherein the actual cadence indicator is indicative of an actual rate of previously transmitted electronic promotion correspondences associated with the first client profile, and wherein the computer-implemented method further comprises:
calculating a plurality of past cadence indicators associated with the first client profile over a past cadence time period;
calculating a plurality of cadence variances between each of the plurality of past cadence indicators and the target cadence indicator; and
based at least in part on the plurality of cadence variances, determining one of the plurality of past cadence indicators as the actual cadence indicator;
retrieving a first electronic correspondence associated with the first client profile; and
in response to determining that the target rate indicated by the target cadence indicator satisfies the actual rate indicated by the actual cadence indicator, transmitting the first electronic correspondence to a client device associated with the first client profile.

8. The computer-implemented method of claim 7, wherein the feedback data is associated with a second client profile, wherein both the first client profile and the second client profile comprise at least one common attribute.

9. The computer-implemented method of claim 7, wherein determining the target cadence indicator further comprises:
adjusting the initial target cadence indicator based at least in part on past engagement level data associated with the first client profile.

10. The computer-implemented method of claim 7, wherein determining the target cadence indicator further comprises:
adjusting the initial target cadence indicator based at least in part on a time factor.

11. The computer-implemented method of claim 7, wherein determining the target cadence indicator further comprises:
adjusting the initial target cadence indicator based at least in part on a cadence goal.

12. The computer-implemented method of claim 7, further comprising:
determining a maximum cadence variance from the plurality of cadence variances, and
selecting a past cadence indicator from the plurality of past cadence indicators that corresponds to the maximum cadence variance as the actual cadence indicator.

13. A computer program product comprising at least one non-transitory computer-readable storage medium having computer-readable program code portions stored therein, the computer-readable program code portions comprising an executable portion configured to:
determine a target cadence indicator indicative of a target rate for transmitting electronic correspondences associated with a first client profile, wherein the computer-readable program code portions comprise the executable portion configured to:
retrieve an initial target cadence indicator associated with the first client profile,
determine feedback data based at least in part on the first client profile, and
calculate the target cadence indicator, via application of an analytical model, based at least in part on adjusting the initial target cadence indicator based on the feedback data;
determine an actual cadence indicator, wherein the actual cadence indicator is indicative of an actual rate of previously transmitted electronic promotion correspondences associated with the first client profile, and wherein the computer-readable program code portions comprise the executable portion configured to:
calculate a plurality of past cadence indicators associated with the first client profile over a past cadence time period;
calculate a plurality of cadence variances between each of the plurality of past cadence indicators and the target cadence indicator; and
based at least in part on the plurality of cadence variances, determine one of the plurality of past cadence indicators as the actual cadence indicator;
retrieve a first electronic correspondence associated with the first client profile; and
in response to determining that the target rate indicated by the target cadence indicator satisfies the actual rate indicated by the actual cadence indicator, transmit the first electronic correspondence to a client device associated with the first client profile.

14. The computer program product of claim 13, wherein the feedback data is associated with a second client profile, wherein both the first client profile and the second client profile comprise at least one common attribute.

15. The computer program product of claim 13, wherein, when determining the target cadence indicator, the computer-readable program code portions comprise the executable portion configured to:
adjust the initial target cadence indicator based at least in part on past engagement level data associated with the first client profile.

16. The computer program product of claim 13, wherein, when determining the target cadence indicator, the computer-readable program code portions comprise the executable portion configured to:
adjust the initial target cadence indicator based at least in part on a time factor.

17. The computer program product of claim 13, wherein, when determining the target cadence indicator, the computer-readable program code portions comprise the executable portion configured to:
adjust the initial target cadence indicator based at least in part on a cadence goal.

* * * * *